United States Patent
Gretz

[11] Patent Number: 5,988,570
[45] Date of Patent: Nov. 23, 1999

[54] CABLE SUPPORT

[75] Inventor: Thomas J. Gretz, Clarks Summit, Pa.

[73] Assignee: Arlington Industries, Inc., Scranton, Pa.

[21] Appl. No.: 09/168,138

[22] Filed: Oct. 7, 1998

[51] Int. Cl.[6] .................. F16L 3/08; F16L 3/22; A47G 29/00
[52] U.S. Cl. .................. 248/74.2; 248/68.1; 248/89
[58] Field of Search .................. 248/68.1, 73, 58, 248/65, 69, 74.1, 74.2, 74.3, 304, 305, 306, 308, 74.4, 74.5, 89, 90, 212, 213; 211/106.01, 118, 87.01

[56] References Cited

U.S. PATENT DOCUMENTS

| | | | |
|---|---|---|---|
| D. 301,684 | 6/1989 | Herzog | D8/356 |
| 355,924 | 1/1887 | Favel | 248/89 |
| 754,483 | 3/1904 | Mustgrove | 248/552 |
| 1,173,603 | 2/1916 | Murray | 292/318 |
| 1,262,763 | 4/1918 | Farley | 248/62 |
| 2,453,248 | 11/1948 | Much | 248/75 |
| 3,029,933 | 4/1962 | Sutter | 206/577 |
| 3,529,795 | 9/1970 | Van Niel | 248/71 |
| 3,659,319 | 5/1972 | Erickson | 24/73 AP |
| 3,991,960 | 11/1976 | Tanaka | 248/68 R |
| 4,023,758 | 5/1977 | Yuda | 248/73 |
| 4,101,103 | 7/1978 | Mooney et al. | 248/58 |
| 4,436,267 | 3/1984 | Eads et al. | 248/75 |
| 4,917,340 | 4/1990 | Jiiemann et al. | 248/74.2 |
| 5,419,362 | 5/1995 | Blackaby | 137/355.16 |
| 5,593,125 | 1/1997 | Storz et al. | 248/316.5 |
| 5,868,362 | 2/1999 | Daoud | 248/71 |

*Primary Examiner*—Derek J. Berger
*Assistant Examiner*—Michael D. Normberg

[57] ABSTRACT

An improved communications cable support which provides a curved surface over which the cabling is laid to insure an entirely smooth transition across the support as well as incorporating an integral resilient top closure side for securing the support after cable installation. Additionally, means are provided to permit separation of individual cables to the greatest extent possible and to inhibit their shifting within the support.

5 Claims, 5 Drawing Sheets

CABLE SUPPORT

FIELD OF THE INVENTION

The present invention relates to a communications cable support useful for the easy, safe and secure installation of such cables, including fiber optic cable.

BACKGROUND OF THE INVENTION

With the advent and growth of computer and communications applications in the business environment, the retrofit installation of delicate and sophisticated cabling such as twisted pair and fiber optic cables has become more and more of an issue. Unlike conventional electrical wiring, such cabling cannot be abused either in its installation or use. Bending excessively, kinking, sharp bending, contact with sharp edges, etc. all can cause harm to the cable which affects its intended performance. This problem is not quite so significant in new construction where cable trays designed to receive such cabling are installed during construction to accommodate current and future needs. In retrofit applications, however, means must be provided for the easy, safe and secure installation and maintenance of such cabling.

Accordingly, a number of hangers or supports for such cabling have been designed and marketed primarily for the retrofit market For example, U.S. Pat. No. 5,740,994 describes a cable support which is generally J-shaped and has a saddle portion which is curved around the base of the J and flat across the base of the J. with one another. Additionally, use of the cable support described in this patent usually requires the use of a cable tie across the open face of the J to secure the cable after installation.

OBJECTS OF THE INVENTION

It is an object of the present invention to provide a cable support structure that provides the smoothest possible transition across the cable support for cables suspended between a plurality of cable supports.

It is another object of the present invention to provide a cable support that eliminates the need for the installation of a cable tie or other device to secure the installed cables into the support Yet another object of the present invention is to provide a cable support having an arrangement which may be used to provide separation of individual cables within the support and to inhibit their shifting therein.

SUMMARY OF THE INVENTION

The present invention describes an improved plastic communications cable support which provides a curved surface over which the cabling is laid to insure an entirely smooth transition across the support as well as incorporating an integral pliable member for securing and locking the support after cable installation. Additionally, an arrangement is provided which may permit separation of individual cables and to inhibit their shifting within the support.

According to the present invention, there is provided an integrally formed communications cable support comprising a rectangular support structure having a base side comprising a supporting surface, a rear attachment side integral with the supporting surface, a front side integral with the supporting surface and opposite from the rear attachment side, and an integral top closure side; the supporting surface having a downward concave curved shape about an axis extending substantially orthogonal relative to said rear attachment side, which provides a smooth transition for communications cable suspended between a plurality of such communications cable supports. According to a preferred embodiment, the downward curved surface includes a series of downwardly curved ridges running parallel to the supporting surface to help prevent shifting of cables across the supporting surface. According to a further preferred embodiment, the integral top closure side is resilient and includes a locking mechanism at one end for engaging the top closure side into an appropriate structure in the attachment side or alternatively the resilient top closure side is simply designed to be positioned below a stop such that installed cables cannot easily be extracted from the cable support without some deflection of the top closure side.

DESCRIPTION OF THE DRAWINGS

The invention will be more fully understood from the following detailed description taken in connection with the accompanying drawings, which form a part of this application and in which.

DETAILED DESCRIPTION OF THE INVENTION

Figure 1:
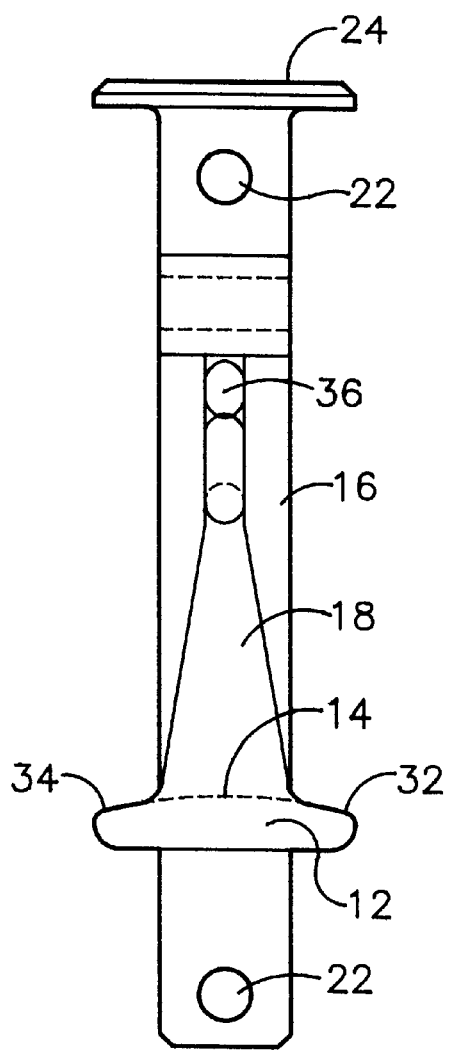
FIG. 1 is a front view of one embodiment of the cable support of the present invention.
Figure 2:
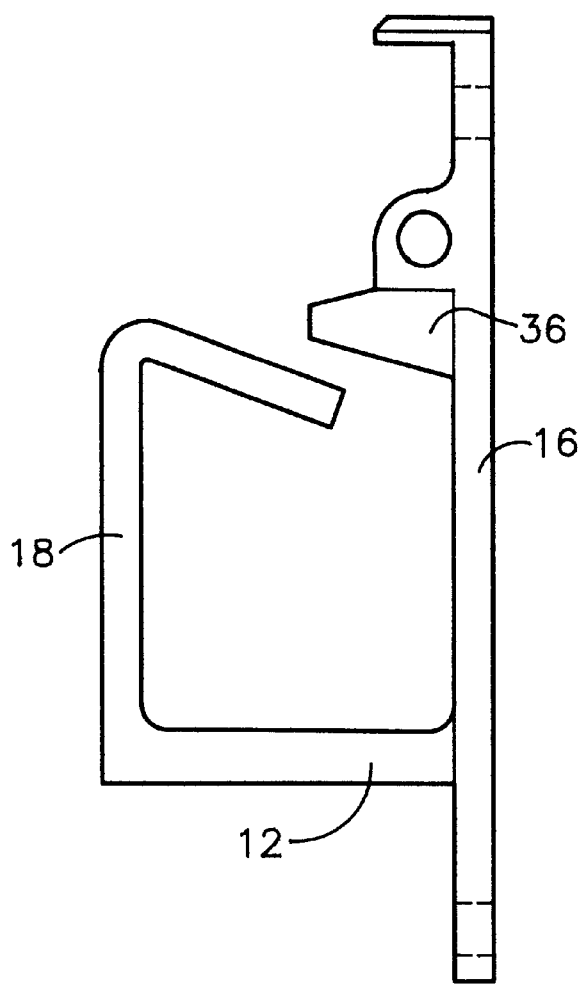
FIG. 2 is a side view of the cable support shown in FIG. 1.
Figure 3:
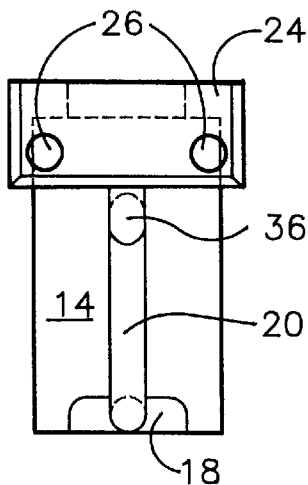
FIG. 3 is a top view of the cable support shown in FIG. 1.

Throughout the following detailed description, similar reference numerals refer to similar elements in all figures of the drawings.

Figure 4:
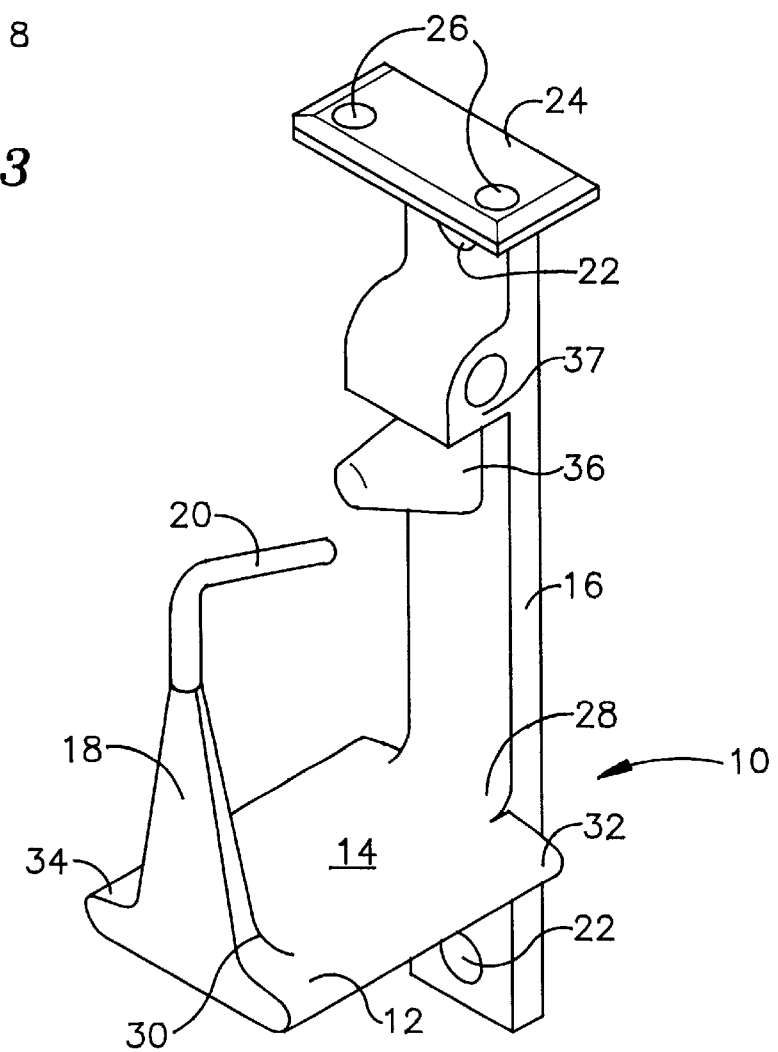
FIG. 4 is a perspective or isometric view of the cable support shown in FIG. 1.

As shown in FIG. 4 which depicts a first preferred embodiment of the cable support of the present invention, cable support 10 is generally rectangular in shape and comprises a base side 12 having a supporting surface 14, a rear attachment side 16, a front side 18 and a top closure side 20. In the embodiment depicted in FIG. 4, rear attachment side 16 is depicted as having holes 22 which make it suitable for mounting to a wall or other vertical structural member of a building and includes a horizontal flat plate 24 having holes 26 for providing attachment to a ceiling or other overhead structural member.

Integrally formed with rear attachment side 16 is base side 12 having supporting surface 14. Base side 12 serves as the direct support for installed cables. Extending vertically and generally parallel to rear attachment side 16 is front side 18 that serves as the third side of a box which contains the installed cables. The joints 28 and 30 where rear attachment side 16 and front side 18 meet base side 12 should be filleted to prevent the existence of any sharp edges that might harm installed cables. Similarly, edges 32 and 34 of base side 12 should be rounded to protect against any damage to installed cables. A radius of about 0.062 inches has been found adequate to provide such protection in one preferred embodiment.

It is a feature of the cable support of the present invention, that surface 14 be curved downwardly as shown most clearly in FIG. 1. The curvature of surface 14 may be varied to accommodate the type and quantity of cable installed in the cable support. The purpose of this curvature, however, remains essentially the same, i.e. to provide the smoothest possible transition as communication cables strung between a plurality of the cable supports pass over the cable supports thereby assuring a minimization of distortion of the cable. According to a preferred embodiment, this radius is about 2.5 inches.

Attached to and preferably integrally formed with front side 18 is top closure side 20. In the embodiment depicted in FIGS. 1 through 4, top closure side 20 comprises a resilient material which can be relatively easily deflected downward for purposes of installing communications cables, but is of such a length as to interfere with stop 36 which is mounted on, and preferably integrally formed with, rear attachment side 16 when an attempt is made to remove cables without first deflecting top closure side 20 to the side to avoid stop 36 or downward so as to permit the removal of cable around top closure side 20 in front of stop 36.

The embodiment depicted in FIGS. 1 through 4 includes a deflector 37 whose sole purpose is to provide a means for guiding cables being installed over stop 36 with a smooth surface which will not damage the cables during installation.

Figure 5:
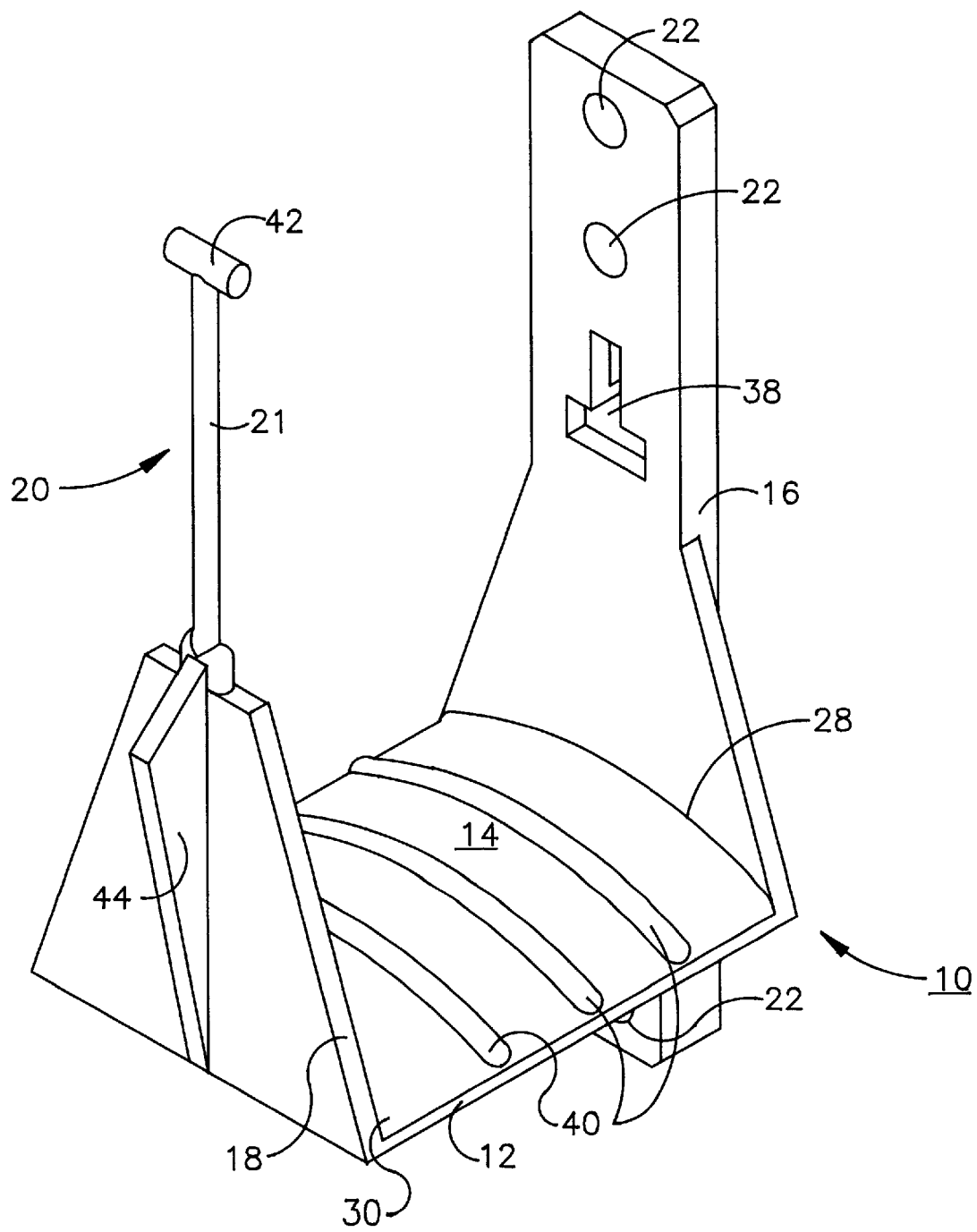
FIG. 5 is a perspective view of an alternative embodiment of the cable support of the present invention.
Figure 6:
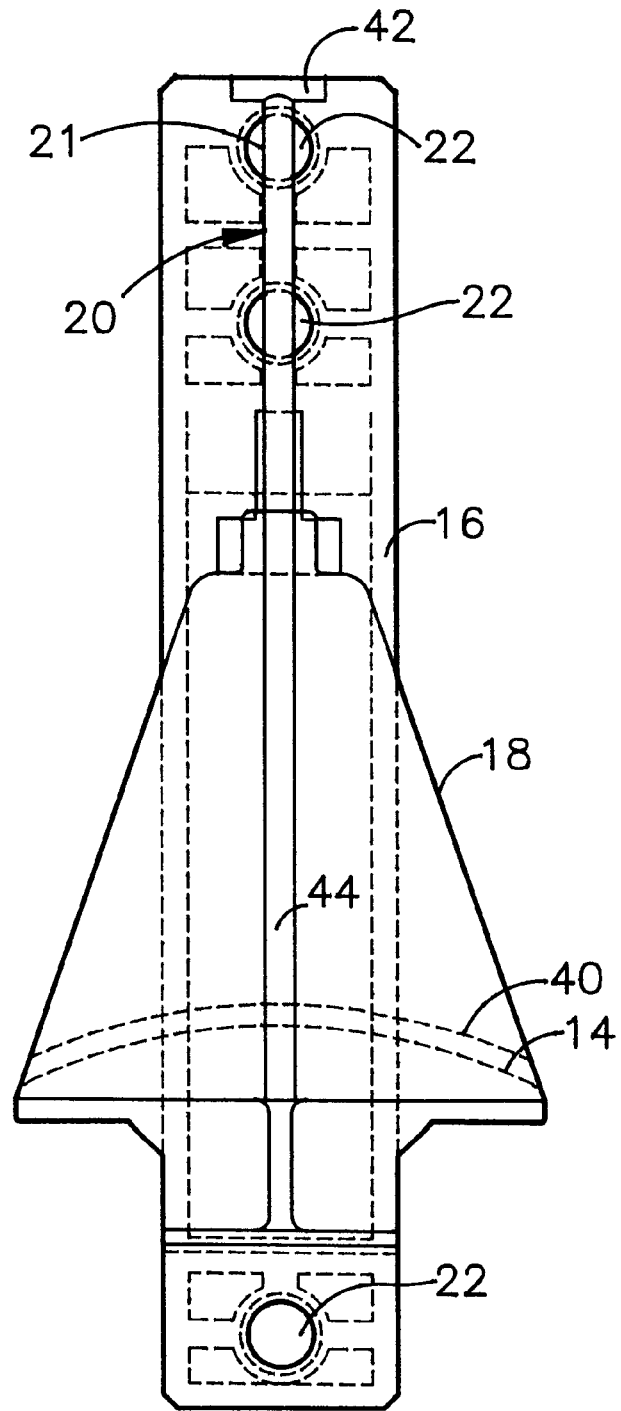
FIG. 6 is a side view of the cable support shown n FIG. 5.
Figure 7:
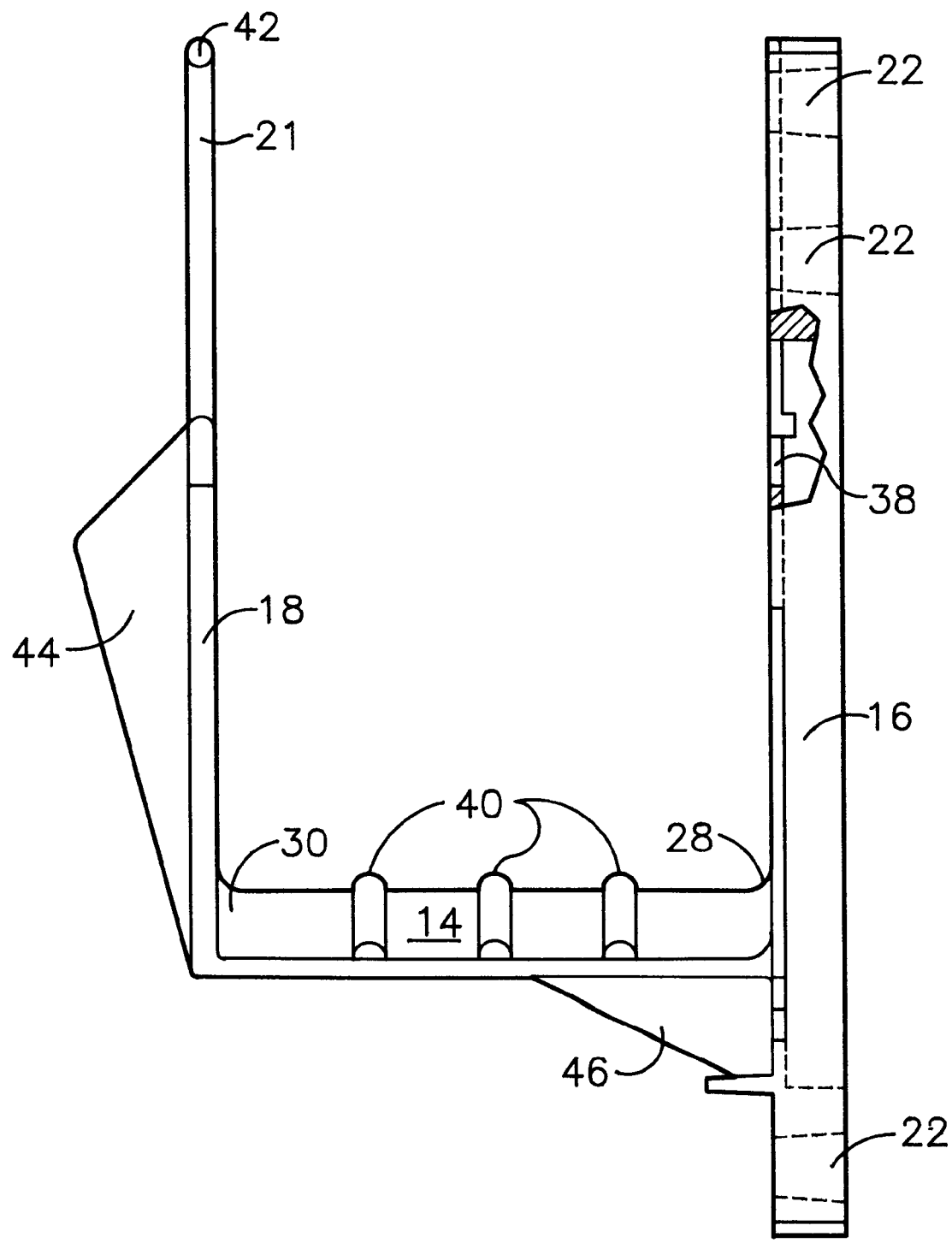
FIG. 7 is a front view of the cable support shown in FIG. 5.

The preferred embodiment of the cable support of the present invention is depicted in FIGS. 5 through 7. The basic structure of the cable support of the present invention depicted here is essentially the same comprising a base side 12, having a supporting surface 14, rear attachment side 16, front side 18 and top closure side 20. Each of these elements serves fundamentally the same function as the corresponding element of the embodiment depicted in FIGS. 1 through 4, however, their physical structure has been somewhat modified.

Rear attachment side 16 is has holes 22 for attachment to an appropriate vertical structural member. The attachment may include a plate like 24 of FIG. 1 for providing attachment to a ceiling or other overhead structural member. A major difference between this embodiment of the cable support and that described hereinabove is that rear attachment side 16 includes locking recess 38 whose utility will be described in connection with the differing structure of closure side 20 hereinafter. Also because of the differing closure mechanism of this embodiment, rear attachment side 16 does not include stop 36.

Supporting surface 14 of base side 20 according to this embodiment, is similarly curved downward and points 28 and 30 may be filleted as shown in FIG. 7. In this embodiment, however, surface 14 incorporates downwardly curved ridges 40. The purpose of these ridges is to inhibit lateral movement or shifting of installed cables within cable support 10, and in the case where few enough cables are installed, to obtain separation of cables. Selection of the number of ridges incorporated is of course a matter of choice, however, three ridges seem to provide adequate function in most installations. Of course, such ridges could be similarly incorporated into supporting surface 12 of the embodiment depicted in FIGS. 1 through 4. Again, the radius of surface 14 is preferably about 2.5 inches.

A major difference between this embodiment and that described above lies in the design of closure side 20. In the instant embodiment, closure side 20 is flexible and resilient as in the previously described case, but it includes, at its extremity, an engaging portion 42 designed to be inserted into inverted T-shaped recess 38 in rear attachment side 16 when bent over base side 12. Additionally, in its initial configuration prior to closure, it stands generally vertical as an extension of front side 18. In this configuration, it is out-of-the-way during the installation step, but is easily bent over and engaging portion 42 inserted into T-shaped recess 38 to secure the installed cables in cable support 10. It is highly desirable and preferred that front side 18 be somewhat pliable and resilient as well, to permit easier bending and insertion of closure side 20 and engaging portion 42 into recess 38. Engagement is, of course achieved by inserting engagement portion 42 into the horizontal portion of inverted T-shaped recess 38 beyond the thickness of the material of rear attachment side 16 and allowing the inherent resilience of top closure 20 to force the balance or leg portion 2 of top closure 20 upward into the vertical portion of recess 38. While the closure side is preferably ⅛" plastic rod, it may also be a flat plastic plate integrally hinged to front side 18.

The embodiments shown in FIGS. 5 through 7 show reinforcing members 44 and 46. While the presence of these members is desirable for structural strength, they are not necessary for the successful practice of the present invention.

From the foregoing description of preferred embodiments, one skilled in the art can easily ascertain the essential characteristics of this invention, and without departing from the spirit and scope thereof, can make various changes and modifications of the invention to adapt it to various usages and conditions. It is intended that the scope of the invention be limited only by the scope of the appended claims.

What is claimed is:

1. An integrally formed one piece plastic communications cable support comprising:
    a support structure having a supporting surface;
    a rear attachment side integral with said supporting surface;
    a front side integral with said supporting surface opposite from said rear attachment side;
    an integral resilient top closure side;
    an enlarged locking mechanism at one end of said top closure side;
    a mating locking mechanism on said rear attachment side; and
    said supporting surface having a downward concave curved shape curved about an axis extending substantially orthogonal relative to said rear attachment side and said front side.

2. The communications cable support of claim 1 wherein said downward curved surface includes a series of ridges for preventing shifting of communications cables across said supporting surface.

3. The communications cable support of claim 1 wherein said resilient closure side is generally T-shaped and said mating locking mechanism comprises an inverted T-shaped recess in said rear attachment side.

4. The communications support of claim 1 wherein said front side is resilient.

5. The communications cable support of claim 1 further including a stop on said rear attachment side, and said top closure side extends from said front side in the direction of said rear attachment side below said stop such that installation of communications cables requires deflection of said top closure side.

* * * * *